Figure 1:
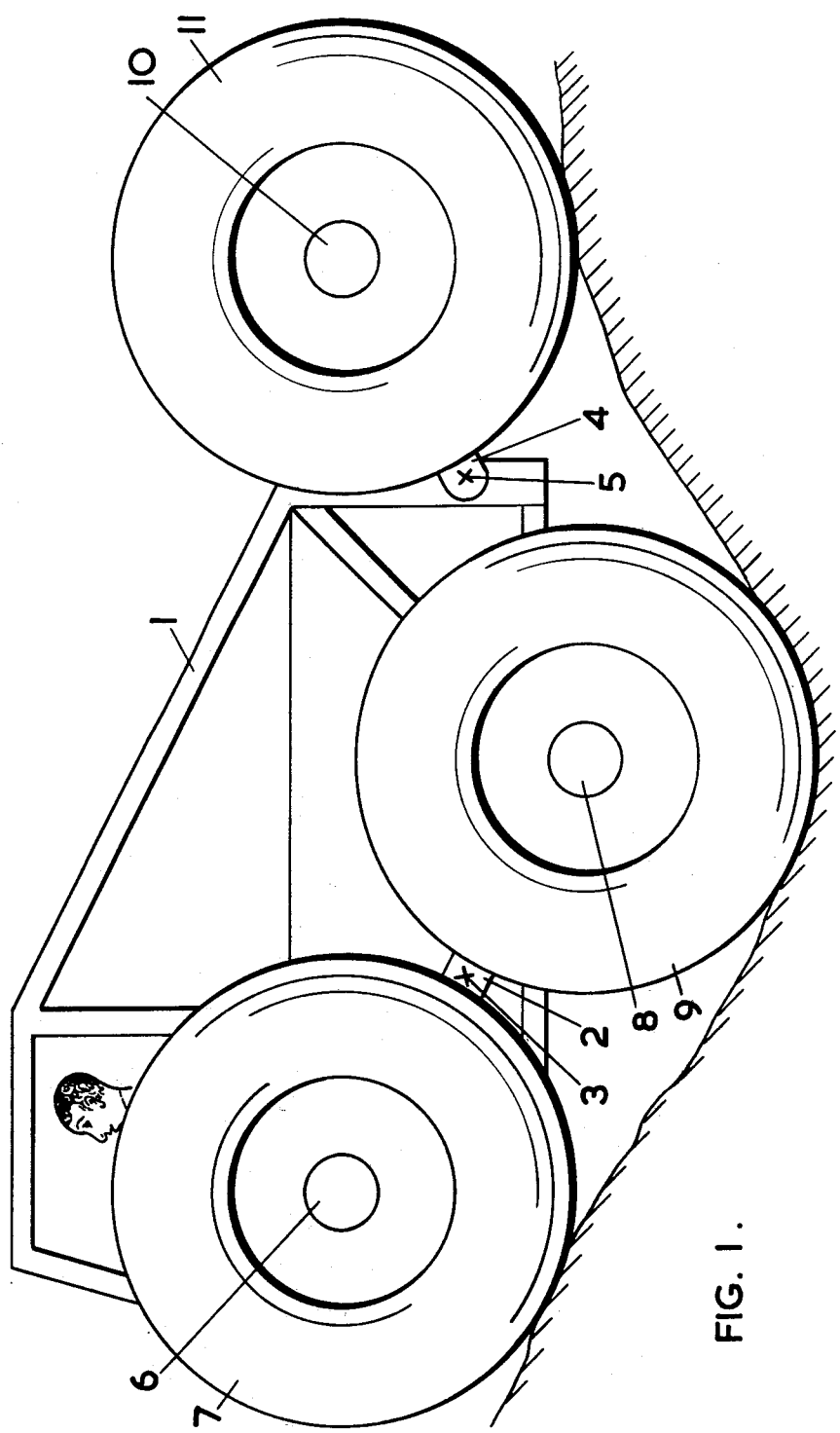

United States Patent [19]

Ross

[11] 4,056,158
[45] Nov. 1, 1977

[54] ROUGH TERRAIN VEHICLES

[75] Inventor: Roderick Buchan Ross, Bordon, England

[73] Assignee: Minister of Agriculture, Fisheries & Food, in Her Britanic Majesty's Government of the U.K. of Great Britain & N. Ireland, London, England

[21] Appl. No.: 677,442

[22] Filed: Apr. 15, 1976

[30] Foreign Application Priority Data

Apr. 16, 1975 United Kingdom ............... 15739/75

[51] Int. Cl.² ............................................. B62D 11/02
[52] U.S. Cl. .................................. 180/6.48; 180/24.02
[58] Field of Search ...................... 180/6.2, 6.48, 6.54, 180/22, 24.02; 280/112 A, 704

[56] References Cited

U.S. PATENT DOCUMENTS

| 2,393,324 | 1/1946 | Joy | 180/6.48 |
| 2,720,403 | 10/1955 | Martin | 280/112 A |
| 3,299,978 | 1/1967 | Sponsler | 180/24.02 X |
| 3,409,100 | 11/1968 | Kronquist | 180/24.02 X |

Primary Examiner—Joseph F. Peters, Jr.
Assistant Examiner—R. Schrecengost
Attorney, Agent, or Firm—Cameron, Kerkam, Sutton, Stowell & Stowell

[57] ABSTRACT

A wheeled vehicle of good stability and high manoeuvreability is disclosed. The vehicle is hydraulically driven and skid-steerable by rotation upon one only, transverse pair of wheels, herein called the pivot wheels, all other wheels being allowed to slide laterally into each new position; and is provided with automatic loading means operative upon the pivot wheels to ensure that ground pressure at these two wheels is always greater, under all drive conditions, than at any other of the wheels. The wheels are articulated to the vehicle frame to absorb irregularities in terrain and provision is also made for adjusting the fore and aft angle of the frame with respect to the wheels for hill climbing or descending.

8 Claims, 6 Drawing Figures

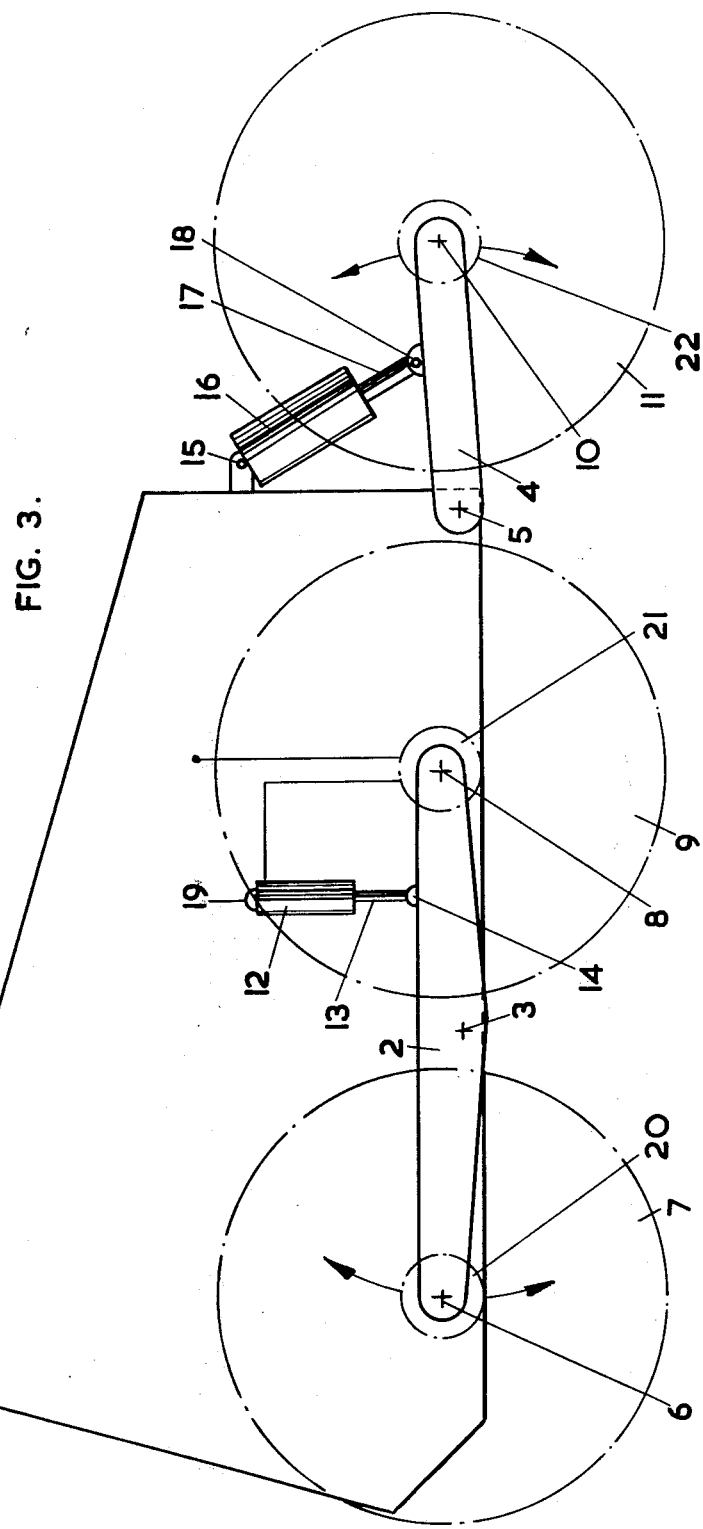

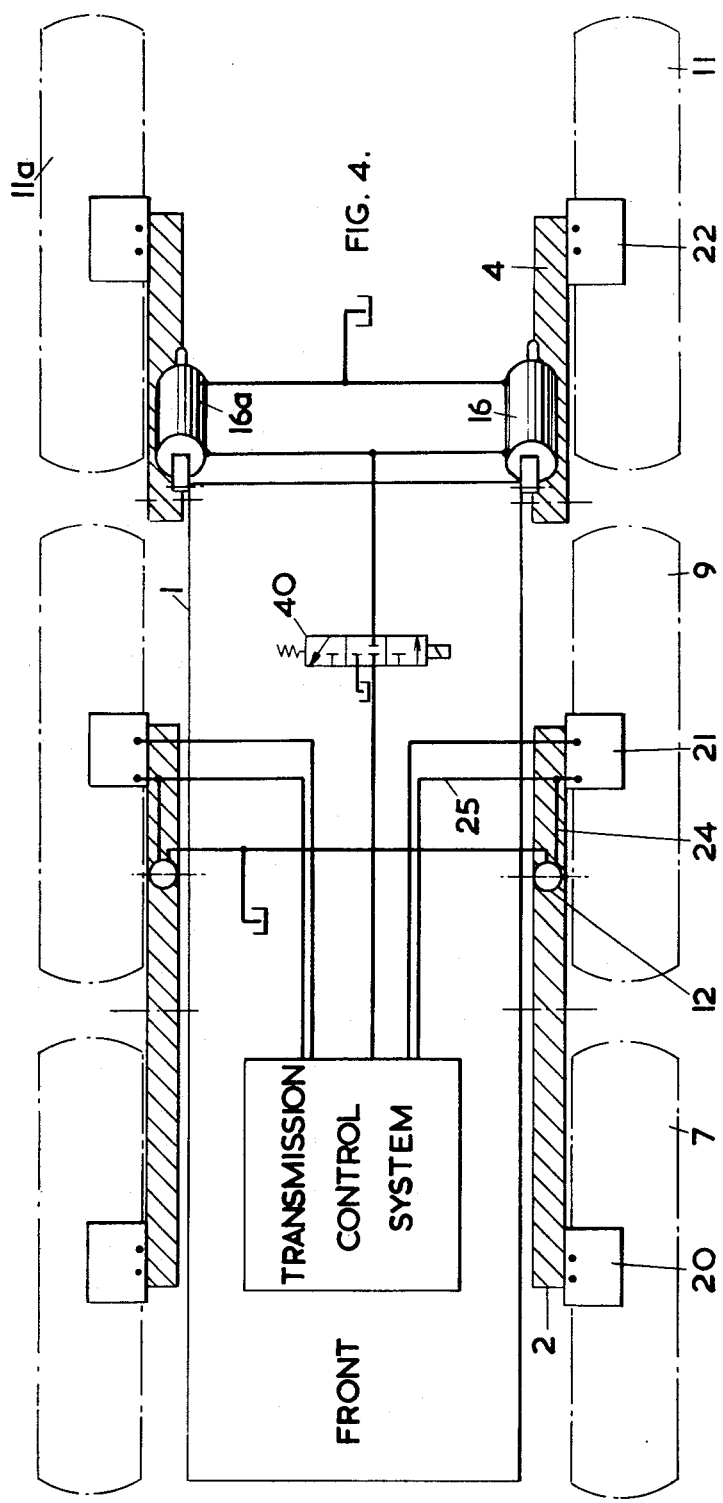

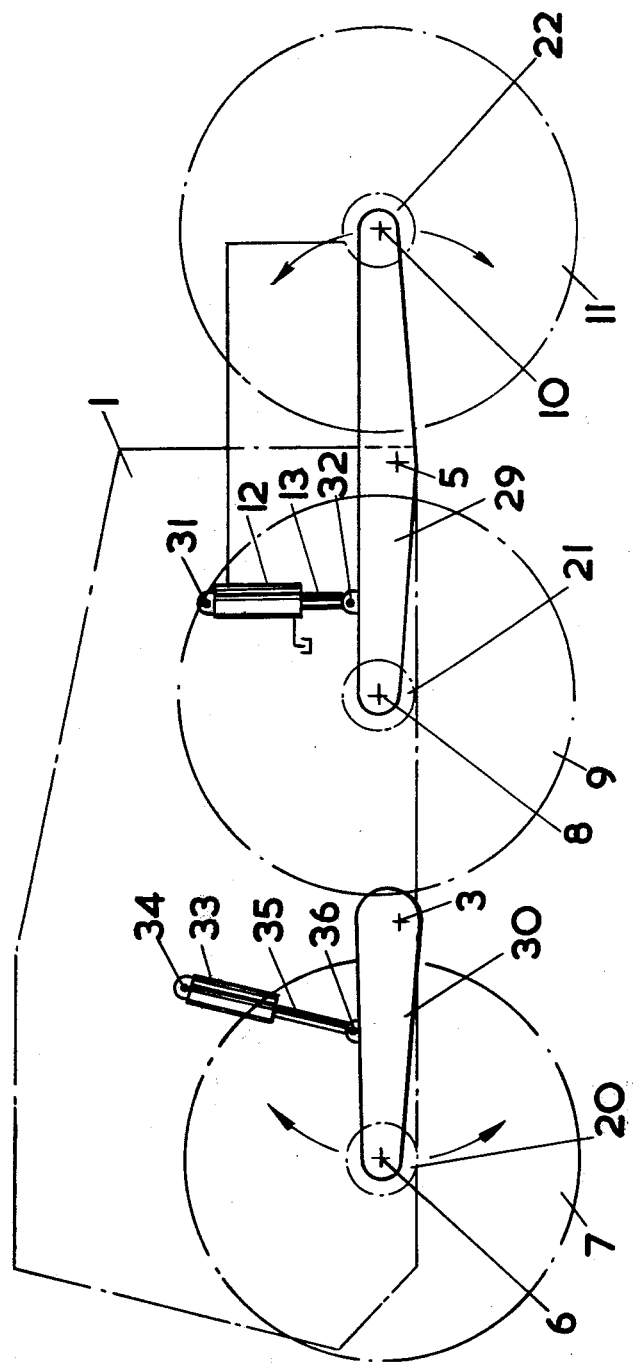

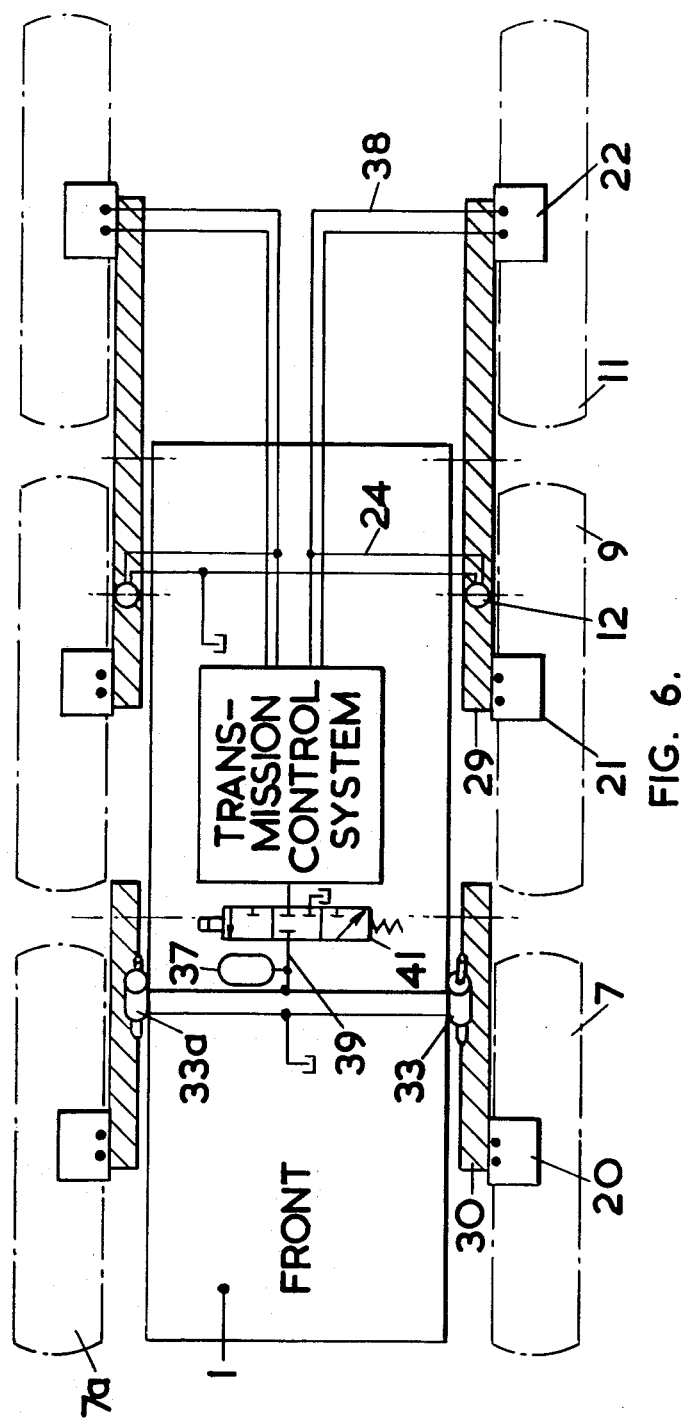

ROUGH TERRAIN VEHICLES

This invention relates to a wheeled vehicle for use on rough terrain both as a transport vehicle and as a working vehicle. In particular but not exclusively, the invention relates to a hydrostatic vehicle with independent drive to each of some of the wheels and is particularly applicable to a rigid framed hydrostatic vehicle with six wheels.

Conventional crawler tractors are commonly used on rough terrain for work purposes such as cultivation and drainage but these suffer from two major disadvantages.

Firstly the vehicles are intended for work at low speeds and cannot be used at higher speeds for transportation across rough ground without excessive discomfort to the driver, and secondly, because ancillary work tools such as a plough or disc coulter are towed behind the tractor, the weight of the vehicle is not used efficiently to assist penetration of the tools into the ground and the power utilised at the tools may well be less than one third of the power that is available at the tractor.

The present invention seeks to provide a stable, rough terrain vehicle with adequate driver comfort so that it may be driven at reasonably high speeds, efficient utilisation of available power at ancillary work tools and good manoeuvreability. Such objectives may be met by the use of a rigid-framed vehicle supported upon individually driven, tyred wheels which are separately articulated to the frame in such a way that irregularities in the terrain will be largely absorbed in the articulation system. Transmission of irregular motion to the rigid frame can be thereby reduced, and it is also possible to design such a vehicle so that a towed work tool can be mounted within the line of the rear wheels, thus bringing the weight of the tool closer into the frame and permitting more efficient transference of power. Further, good stability can be provided in such a vehicle, preferably with six wheels, and a high degree of manoeuvreability can be achieved by employing skid steering.

In this method of steering a rotational velocity differential is applied to the wheels at one side of the frame with respect to the wheels at the other side of the frame and provided that the vertical loading is greater at the centre wheels that at any of the others, the vehicle will turn on the centre wheels causing the front and back wheels to skid laterally into the required new position. If the weight distribution of the vehicle is arranged so that its centre of gravity lies between the front and centre wheels and acts through a point which is displaced rearward from the front wheels by a distance which is no less than half the total distance between the front and centre wheels, the essential aforementioned loading proviso for effective skid steering is automatically met when the vehicle is in a stationary condition and also when it is travelling under load in a forward direction, as torque reaction at the wheels acts to increase pressure of the centre wheels upon the ground to decrease pressure of the front wheels upon the ground. However, when the vehicle is moving in reverse direction or braking, torque reaction at each wheel has the opposite effect, pressure upon the ground being decreased at the centre wheels and increased at the front wheels. The distribution of pressure at the wheels becomes increasingly adverse as wheel torque rises and it is therefore essential to compensate for this effect if reliable sterring is to be achieved.

A vehicle according to the present invention comprises a rigid frame supported upon wheels, and loading means from automatically applying to one or more of those wheels a downwardly acting force to compensate for any reduction in ground pressure on said one or more wheels resulting from torque reaction between any or all of the wheels and the ground. The frame may be supported upon three or more wheels and be skid-steerable by rotation upon a transverse pair of those wheels, hereinafter called the pivot wheels, the loading means being applied to each one of the pivot wheels.

Preferably the frame is supported upon the wheels by means of articulated suspension members and the wheels are each independently driven, preferably by hydraulic motors.

The loading means for each pivot wheel may comprise a hydraulic cylinder conveniently arranged in the fluid supply line of one or more said hydraulic motors such that pressure developed in the motor under torque conditions is applied via the cylinder piston directly, or via intermediate members, to the axle of the pivot wheel.

The preferred use of a hydraulic drive system also has advantage in that all the motivating functions of the vehicle can be simply controlled by means of a single lever possibly of the joystick type. As the lever control unit may be flexibly coupled with the unit it is controlling, it is also possible to arrange the springing of the driver's cabin in such a way that the control unit moves up and down with the driver rather than with the main vehicle frame.

A further advantage is that the hydraulic fluid supply may also be used to operate ancillary work tools to the vehicle.

Preferably the rigid frame of the vehicle according to the present invention is supported upon 6 wheels, each one rotatably mounted upon a suspension member which is rotatably attached to the rigid frame so as to turn about an axis parallel to and displaced from the axis of rotation of the wheel. The front and centre wheels of each side of the vehicle may be conveniently located with respect to one another by mounting them on a common suspension member which member is pivotally attached to the frame at a position on the suspension member approximately midway between the axles of the two wheels such that when the front wheel rises with respect to the frame, the centre wheel falls and vice versa. Alternatively, the centre wheel suspension member may be conjoined with that of the rear wheel.

The position of the individual, rotatably mounted rear wheel suspension members with respect to the frame may be controlled by means of a hydraulic cylinder mounted in the plane of rotation of the suspension member and pivotally attached to both the frame and the suspension member. The rear wheel cylinders may be hydraulically coupled together so that as one wheel rises the other falls. Additionally, under the control of the driver, hydraulic fluid may be added to or removed from the coupled cylinders so that the rear of the vehicle may be raised or lowered with respect to the mean level of the two rear wheels. Advantages of this arrangement are the alleviation of discomfort that is available to the driver by selection of a suitable frame angle for hill climbing or descending, the ability to ensure that the primary driving engine is not being forced to operate at an unfavourable angle of inclination and the ability to lower the vehicle frame at the rear for easier loading and unloading. Such arrangement of hydraulic cylinders may be alternatively applied to each front wheel suspension member when the centre wheel suspension member is conjoined with that of the rear wheel.

Figure 2:
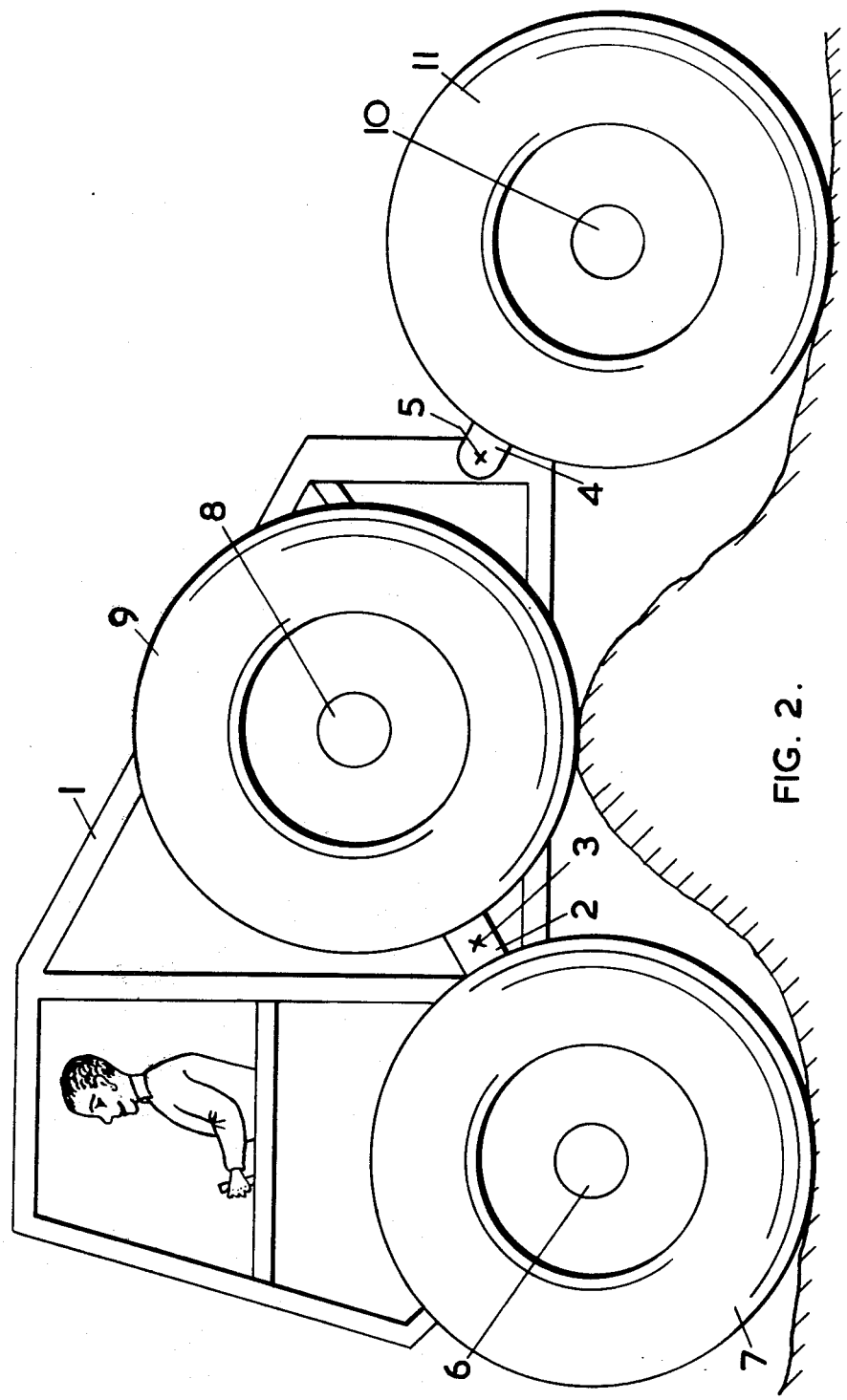

Embodiments of the invention are now described by way of example only, with reference to the accompanying drawings of which:

FIGS. 1 & 2 are diagrammatic side views of one embodiment of a six-wheeled vehicle incorporating the invention and having commonly articulated centre and front wheels, illustrating the action of the wheels on rough terrain, FIG. 3 is a diagrammatic representation of one side of the vehicle shown in FIGS. 1 & 2 ad illustrating the arrangement of the suspension members and hydraulic cylinders, FIG. 4 is a diagrammatic plan view of the vehicle shown in FIG. 3, and illustrates the arrangement of hydraulic motors and cylinders, and FIGS. 5 and 6 are diagrammatic side and plan views respectively of a second embodiment of a six-wheeled vehicle incorporating the invention and having commonly articulated centre and rear wheels.

The general purpose vehicle illustrated in FIGS. 1 and 2 comprises a rigid frame 1, supported upon an articulated wheel system which is symmetrical about the vertical fore and aft plane through the centre of the vehicle. The following description will therefore be confined to one side of the vehicle only, the other side being a mirror of the first.

The rigid frame 1 is supported at two bearing points, the forward part of the frame being pivotally attached to the centre of a front suspension beam 2 at a pivot 3 and the rear part of the frame being pivotally attached to one end of a rear suspension beam 4 at a pivot 5, the lengths of both beams being parallel with the aforesaid vertical fore and aft plane and the axes of both pivots being perpendicular to said plane. One end of the front suspension beam 2 is attached to an axle housing 6 of a front wheel 7 and the other end is attached to an axle housing 8 of a centre wheel 9. The rear suspension beam 4 is attached at its remote end to an axle housing 10 of a rear wheel 11 and is further coupled to the rigid frame 1 at a pivot 15 by a hydraulic cylinder 16, a piston rod 17 and a pivot 18 (FIG. 3).

An identical arrangement exists for the rear wheel on the other side of the vehicle (see FIG. 4) and the two hydraulic cylinders 16 and 16a locating the rear wheels are hydraulically connected in parallel so that as one wheel rises the other falls. Additionally, hydraulic fluid is supplied to the coupled rear wheel cylinders via a solenoid operated valve 40 enabling fluid to be added to or removed from the coupled cylinders so that the rear of the rigid frame 1 may be raised or lowered with respect to the mean level of the two rear wheels.

The disposition of vehicle wheels shown in FIG. 1 and 2 illustrates the variation in attitude that occurs when the vehicle moves over rough terrain. The axle housings 6 and 8 rotate about the pivot 3 of the suspension beam 2 and the axle housing 10 rotates about the pivot 5 of the suspension beam 4. With this arrangement of suspension beams the weight of the forward part of the vehicle is supported by the front and centre wheels jointly, and provided that the centre of gravity of the vehicle acts through a point lying between the pivot 3 of the front suspension beam 2 and the axle housing 8 of the centre wheel 9, ground pressure at the centre wheel will be advantageously increased during forward motion by torque reaction occurring between the front and centre wheels and the ground, but adversely decreased by such torque reaction during reverse motion and forward braking.

The vehicle wheels 7, 9 and 11 are driven, each about its own axis, by meas of hydraulic motors 20, 21 and 22 separately attached to the respective axle housings 6, 8 and 10. Compensation for adverse torque reaction at the centre wheel 9 is provided by a hydraulic cylinder 12 which is mounted upon the rigid frame 1 at a pivot 19 and arranged so that its piston rod 13 bears down upon the front suspension beam 2 at a pivot 14, which pivot is attached to the beam at a position rearward of the pivot 3. The cylinder 12 is supplied, via a pressure line 24, with hydraulic fluid from a reverse direction pressure line 25 to the hydraulic motor 21 of the wheel 9 (FIG. 4), so that the condition of high pressure that exists within the motor 21 in reverse motion or forward braking acts to increase the prressure within the cylinder 12 thus automatically applying a downward force proportional to the torque of the wheel 9 to the axle housing 8, via the piston rod 13 and the suspension beam 2. The magnitude of the force applied to the axle housing 8 is dependent upon the distance of the pivot 14 from the pivot 3.

Transmission is controlled by a closed circuit, hydraulic, remote control system operating directly on a pump servo motor (not shown). Braking is dynamic through the system, and full control can be achieved with a single lever.

Ancillary tool units (not shown) can be mounted on the vehicle frame inside the line of the rear wheels and operated by the same hydraulic fluid supply that is used for transmission. Operation of such tools can be controlled by solenoid operated valves situated near the tool unit and electrically actuated by means of push buttons located in the driver's cabin.

An alternative suspension arrangement for the rear wheels of this embodiment which has some of the advantages of the previously described articulation system is to have the rear wheels mounted on a common axle which is itself centrally pivoted to the rear of the frame to rotate about a fore and aft axis.

A second embodiment of a six-wheeled vehicle according to the invention is illustrated in FIGS. 5 and 6. In this arrangement the centre wheel 9 and the rear wheel 11 are attached via their respective axle housings 8 and 10, one at each end of a common rear suspension beam 29, the centre of which beam is pivotally attached to the rear part of the frame 1 at the pivot 5. The front wheel 7 is attached via its axle housing 6 to one end of a front suspension beam 30, the other end of which is pivotally attached to the forward part of the frame 1 at the pivot 3.

The hydraulic cylinder 12 is attached to the rigid frame 1 at a pivot 31 in this embodiment, and arranged so that the piston rod 13 bears down upon the rear suspension beam 29 at a pivot 32 attached to the beam at a position forward of the pivot 5, the magnitude of the downwardly acting force exerted at the axle housing 8 by the piston rod 13 being dependent upon the distance of the pivot 32 from the axle housing 8. As in the first embodiment, the vehicle wheels 7, 9 and 11 are independently driven by the hydraulic motors 20, 21 and 22 respectively.

The weight distribution of the vehicle with respect to the common suspension beam 29 of this embodiment is such that the centre of gravity acts through a point lying between the pivot 5 and the axle housing 8 of the centre wheel 9. Consequently the effect of torque reaction between the centre and rear wheels and the ground is adversely to decrease ground pressure at the centre wheel during forward motion and rearward braking, and advantageously to increase ground pressure at the centre wheel during reverse motion and forward braking. A corresponding increase of hydraulic pressure occurs in a forward direction pressure line 38 of the hydraulic motor 22 driving the rear wheel 11 during forward motion and rearward braking, and it is this pressurised fluid that is applied to the hydraulic cylinder 12 via a pressure line 24, to provide a compensating loading force at the centre wheel 9.

The front suspension beam 30 is supported with respect the frame 1 by a hydraulic cylinder 33, attached to the frame at a pivot 34, and having a piston rod 35 which is attached to the beam 30 at a pivot 36. A similar cylinder 33a is provided for the front wheel 7a at the other side of the vehicle, and both the respective cylinders 33 and 33a are hydraulically connected in parallel to a common fluid supply line 39, thereby providing that as one front wheel rises the other will fall. A hydro-cushion 37 is also connected to the fluid supply line 39 to increase the compliance of the front wheel suspension system.

Additionally, hydraulic fluid may be added to or removed from the coupled cylinders 33 and 33a by means of a solenoid operated control valve 41 in the supply line 39, in order to adjust the fore and aft angle of inclination of the frame 1.

It will be apparent that all of the hydraulic cylinders employed in both of the foregoing embodiments also serve as wheel dampers if fitted with suitable restrictors.

I claim:

1. A vehicle comprising a rigid frame supported upon a plurality of wheels and skid-steerable by rotation upon a transverse pair of said wheels, each wheel of said transverse pair being called herein a pivot wheel, an operator-commandable transmission control system, hydraulic drive motors under the control of fluid transmission lines from said control system for independently driving at least the two pivot wheels, and hydraulic loading means downwardly operative upon each pivot wheel, each of said hydraulic loading means being in fluid connection with the fluid transmission line of one of said hydraulic drive motors and so constructed and arranged that fluid pressure developed within said one hydraulic drive motor by rotational resistance at its driven wheel acts via the hydraulic, loading means to increase ground pressure at the said pivot wheel.

2. A vehicle as claimed in claim 1 wherein said hydraulic loading means for each pivot wheel comprises a piston and cylinder arrangement freely pivoted to the rigid frame and operatiave upon the respective pivot wheel.

3. A vehicle as claimed in claim 1, wherein each wheel has an articulated connection to the rigid frame comprising a rigid suspension member pivotally mounted at a frame mounting point on the frame for rotation in a vertical plane about a transverse axis thereof, the wheel being mounted for rotation about its own axis on the suspension member at a point remote from the frame mounting point.

4. A vehicle as claimed in claim 3 supported upon six independently drivable wheels arranged as a first transverse wheel pair and a second transverse wheel pair with the pair of pivot wheels disposed between the first and second transverse wheel pairs; the arrangement on each side of the vehicle being that the pivot wheel of the first pair are mounted for rotation about their respective axes on a common suspension member which is pivotally mounted at a frame mounting point intermediate between the pivot wheel and the wheel of said first pair, and that the said hydraulic loading means is operative upon the common suspension member at a bearing point intermediate between the frame mounting point and the pivot wheel axis. Serial No. 677,442

5. A vehicle as claimed in claim 4 including two hydraulic cylinder and piston assemblies for controlling the angular positions of the two suspension members associated with the second transverse wheel pair, each of said hydraulic cylinder and piston assemblies being operatively connected between the frame and the respective suspension member, and each constrained to operate reciprocally by a hydraulic interconnection between the two said assemblies so constructed and arranged that a common volume of hydraulic fluid is shared between them.

6. A vehicle as claimed in claim 5 further provided with operator-controlled valve means for varying the common volume of hydraulic fluid contained within the two cylinder and piston assemblies associated with the second transverse wheel pair.

7. A vehicle as claimed in claim 4 wherein the first transverse wheel pair constitutes the front wheels of the vehicle, and wherein said hydraulic Serial No. 677,442 loading means is in fluid connection with a reverse-drive fluid transmission line to the hydraulic drive motor of one of the pivot wheels.

8. A vehicle as claimed in claim 4 wherein the first transverse wheel pair constitutes the rear wheels of the vehicle, and wherein said hydraulic loading means is in fluid connection with a forward-drive fluid transmission line to the hydraulic drive motor of one of said rear wheels.

* * * * *

UNITED STATES PATENT AND TRADEMARK OFFICE
CERTIFICATE OF CORRECTION

PATENT NO. : 4,056,,158
DATED : Nov. 1, 1977
INVENTOR(S) : Roderick Buchan Ross

It is certified that error appears in the above-identified patent and that said Letters Patent are hereby corrected as shown below:

Column 1, line 8, "of" first occurrence should be -- or -- line 59, after "ground" insert --and--. Column 2, line 3, "from" should read --for--. Column 3, line 30, after "mirror" insert --image--. Column 6, lines 25 and 44, delete "Serial No. 677,442".

Signed and Sealed this

Twenty-eighth Day of March 1978

[SEAL]

Attest:

RUTH C. MASON
Attesting Officer

LUTRELLE F. PARKER
Acting Commissioner of Patents and Trademarks